US008838850B2

(12) United States Patent
Dommeti et al.

(10) Patent No.: US 8,838,850 B2
(45) Date of Patent: Sep. 16, 2014

(54) CLUSTER CONTROL PROTOCOL

(75) Inventors: Sivaram Dommeti, Sunnyvale, CA (US); Som Sikdar, Sunnyvale, CA (US); Erik de la Iglesia, Sunnyvale, CA (US)

(73) Assignee: Violin Memory, Inc., Santa Clara, CA (US)

( * ) Notice: Subject to any disclaimer, the term of this patent is extended or adjusted under 35 U.S.C. 154(b) by 858 days.

(21) Appl. No.: 12/619,609

(22) Filed: Nov. 16, 2009

(65) Prior Publication Data
US 2010/0125857 A1    May 20, 2010

Related U.S. Application Data

(60) Provisional application No. 61/115,426, filed on Nov. 17, 2008.

(51) Int. Cl.
| G06F 3/00 | (2006.01) |
| G06F 13/00 | (2006.01) |
| G06F 5/00 | (2006.01) |
| H04L 29/12 | (2006.01) |
| G06F 3/06 | (2006.01) |
| H04L 29/08 | (2006.01) |

(52) U.S. Cl.
CPC .......... *H04L 67/1097* (2013.01); *H04L 61/106* (2013.01); *H04L 67/1095* (2013.01); *G06F 3/0635* (2013.01); *H04L 29/12858* (2013.01); *H04L 61/6031* (2013.01); *H04L 61/6045* (2013.01); *G06F 3/067* (2013.01); *G06F 3/0604* (2013.01); *H04L 29/12866* (2013.01)
USPC ...................... 710/32; 710/9; 710/10; 710/36

(58) Field of Classification Search
None
See application file for complete search history.

(56) References Cited

U.S. PATENT DOCUMENTS

| 5,305,355 | A | * | 4/1994 | Go et al. .................. 375/356 |
| 5,954,796 | A | * | 9/1999 | McCarty et al. .............. 709/222 |
| 6,041,366 | A | | 3/2000 | Maddalozzo et al. |
| 6,401,147 | B1 | | 6/2002 | Sang et al. |
| 6,636,982 | B1 | * | 10/2003 | Rowlands ................... 714/4.1 |
| 6,678,795 | B1 | | 1/2004 | Moreno et al. |
| 6,721,870 | B1 | | 4/2004 | Yochai et al. |
| 6,742,084 | B1 | | 5/2004 | Defouw et al. |
| 6,789,171 | B2 | | 9/2004 | Desai et al. |
| 6,810,470 | B1 | | 10/2004 | Wiseman et al. |
| 7,017,084 | B2 | | 3/2006 | Ng et al. |
| 7,089,370 | B2 | | 8/2006 | Luick |
| 7,110,359 | B1 | | 9/2006 | Acharya |

(Continued)

OTHER PUBLICATIONS

Mark Friedman, Odysseas Pentakalos, Windows 2000 Performance Guide. File Cache Performance and Tuning [reprinted online]. O'Reilly Media. Jan. 2002 [retrieved on Oct. 29, 2012]. Retrieved from the internet: <URL:http://technet.microsoft.com/en-us/library/bb742613.aspx#mainSection>.

(Continued)

*Primary Examiner* — Kris Rhu
(74) *Attorney, Agent, or Firm* — Brinks Gilson and Lione

(57) ABSTRACT

A cluster of storage control members connect different clients to different storage disks. Connection path information between the different clients and disks is discovered and distributed to the storage cluster members. The connection path information is then used to maintain coherency between tiering media contained in the different storage cluster members. Unique Small Computer System Interface (SCSI) identifiers may be associated with the different connection paths to uniquely identify particular storage disks connected to the clients.

15 Claims, 9 Drawing Sheets

(56) References Cited

U.S. PATENT DOCUMENTS

| | | |
|---|---|---|
| 7,856,533 B2 | 12/2010 | Hur et al. |
| 7,870,351 B2 | 1/2011 | Resnick |
| 7,873,619 B1 | 1/2011 | Faibish et al. |
| 7,975,108 B1 | 7/2011 | Holscher et al. |
| 8,010,485 B1* | 8/2011 | Chatterjee et al. ............ 707/609 |
| 2002/0035655 A1 | 3/2002 | Finn et al. |
| 2002/0175998 A1 | 11/2002 | Hoang |
| 2002/0194434 A1 | 12/2002 | Kurasugi |
| 2003/0012204 A1 | 1/2003 | Czeiger et al. |
| 2003/0167327 A1 | 9/2003 | Baldwin et al. |
| 2003/0177168 A1 | 9/2003 | Heitman et al. |
| 2003/0210248 A1 | 11/2003 | Wyatt |
| 2004/0128363 A1* | 7/2004 | Yamagami et al. ............ 709/217 |
| 2004/0146046 A1* | 7/2004 | Jo et al. ......................... 370/351 |
| 2004/0186945 A1 | 9/2004 | Jeter et al. |
| 2004/0215923 A1 | 10/2004 | Royer |
| 2005/0025075 A1 | 2/2005 | Dutt et al. |
| 2005/0195736 A1 | 9/2005 | Matsuda |
| 2005/0234916 A1* | 10/2005 | Bergman et al. ................ 707/10 |
| 2006/0005074 A1 | 1/2006 | Yanai et al. |
| 2006/0034302 A1 | 2/2006 | Peterson |
| 2006/0053263 A1 | 3/2006 | Prahlad et al. |
| 2006/0075191 A1 | 4/2006 | Lolayekar et al. |
| 2006/0112232 A1 | 5/2006 | Zohar et al. |
| 2006/0212524 A1 | 9/2006 | Wu et al. |
| 2006/0218389 A1 | 9/2006 | Li et al. |
| 2006/0277329 A1 | 12/2006 | Paulson et al. |
| 2007/0050548 A1 | 3/2007 | Bali et al. |
| 2007/0079105 A1 | 4/2007 | Thompson |
| 2007/0118710 A1 | 5/2007 | Yamakawa et al. |
| 2007/0124407 A1* | 5/2007 | Weber et al. ................... 709/212 |
| 2007/0192444 A1 | 8/2007 | Ackaouy et al. |
| 2007/0233700 A1* | 10/2007 | Tomonaga ...................... 707/10 |
| 2007/0283086 A1 | 12/2007 | Bates |
| 2008/0028162 A1 | 1/2008 | Thompson |
| 2008/0098173 A1 | 4/2008 | Chidambaran et al. |
| 2008/0104363 A1 | 5/2008 | Raj et al. |
| 2008/0162864 A1 | 7/2008 | Sugumar et al. |
| 2008/0215827 A1* | 9/2008 | Pepper .......................... 711/154 |
| 2008/0215834 A1 | 9/2008 | Dumitru et al. |
| 2008/0250195 A1 | 10/2008 | Chow et al. |
| 2008/0320269 A1 | 12/2008 | Houlihan et al. |
| 2009/0006725 A1 | 1/2009 | Ito et al. |
| 2009/0006745 A1 | 1/2009 | Cavallo et al. |
| 2009/0034377 A1 | 2/2009 | English et al. |
| 2009/0110000 A1 | 4/2009 | Brorup |
| 2009/0240873 A1 | 9/2009 | Yu et al. |
| 2009/0259800 A1 | 10/2009 | Kilzer et al. |
| 2009/0262741 A1 | 10/2009 | Jungck et al. |
| 2009/0276588 A1 | 11/2009 | Murase |
| 2009/0307388 A1 | 12/2009 | Tchapda |
| 2010/0011154 A1 | 1/2010 | Yeh |
| 2010/0030809 A1 | 2/2010 | Nath |
| 2010/0080237 A1 | 4/2010 | Dai et al. |
| 2010/0088469 A1 | 4/2010 | Motonaga et al. |
| 2010/0115206 A1 | 5/2010 | de la Iglesia et al. |
| 2010/0115211 A1 | 5/2010 | de la Iglesia et al. |
| 2010/0122020 A1 | 5/2010 | Sikdar et al. |
| 2010/0169544 A1 | 7/2010 | Eom et al. |
| 2010/0174939 A1 | 7/2010 | Vexler |
| 2011/0047347 A1 | 2/2011 | Li et al. |
| 2011/0258362 A1 | 10/2011 | McLaren et al. |
| 2012/0198176 A1 | 8/2012 | Hooker et al. |

OTHER PUBLICATIONS

Stolowitz Ford Cowger Listing of Related Cases, Feb. 7, 2012.

Rosenblum, Mendel and Ousterhout, John K., The LFS Storage Manager. Proceedings of the 1990 Summer Usenix. 1990 pp. 315-324.

\* cited by examiner

EXAMPLE CONFIGURATION 362

| Path ID | Initiator | Target | LUN | SCSI Identity |
|---|---|---|---|---|
| 1 | A | D | X | 1 |
| 2 | A | D | Y | 2 |
| 3 | A | E | X | 3 |
| 4 | A | E | Y | 4 |
| 5 | B | D | X | 1 |
| 6 | B | D | Y | 2 |
| 7 | B | E | X | 3 |
| 8 | B | E | Y | 4 |
| 9 | C | D | X | 1 |
| 10 | C | D | Y | 2 |
| 11 | C | E | X | 3 |
| 12 | C | E | Y | 4 |

365A    365B   365C    365D    365E

CONFIGURATION TABLE 365

EXAMPLE CONFIGURATION 364

| Path ID | Initiator | Target | LUN | SCSI Identity |
|---|---|---|---|---|
| 1 | A | D | X | 1 |
| 2 | A | D | Y | 2 |
| 3 | A | E | X | 1 |
| 4 | A | E | Y | 2 |
| 5 | B | D | X | 1 |
| 6 | B | D | Y | 2 |
| 7 | B | E | X | 1 |
| 8 | B | E | Y | 2 |
| 9 | C | D | X | 1 |
| 10 | C | D | Y | 2 |
| 11 | C | E | X | 1 |
| 12 | C | E | Y | 2 |

370A ⌐  370B ⌐ 370C ⌐  370D ⌐  370E ⌐

CONFIGURATION TABLE 370

LBA Mapping Table 385

| Path ID | SCSI Identity | Disk Size | VBA Range | LLBA Offset | Tiering Location |
|---|---|---|---|---|---|
| 1 | 1 | 1000 | 0 - 999 | 0 | S1 |
| 2 | 2 | 2000 | 1000 - 2999 | 1000 | S1 |
| 3 | 3 | 4000 | 3000 - 6999 | 3000 | S2 |
| 4 | 4 | 8000 | 7000 - 14999 | 7000 | S3 |
| 5 | 1 | 1000 | 0 - 999 | 0 | S1 |
| 6 | 2 | 2000 | 1000 - 2999 | 1000 | S1 |
| 7 | 3 | 4000 | 3000 - 6999 | 3000 | S2 |
| 8 | 4 | 8000 | 7000 - 14999 | 7000 | S3 |
| 9 | 1 | 1000 | 0 - 999 | 0 | S1 |
| 10 | 2 | 2000 | 1000 - 2999 | 1000 | S1 |
| 11 | 3 | 4000 | 3000 - 6999 | 3000 | S2 |
| 12 | 4 | 8000 | 7000 - 14999 | 7000 | S3 |

FIG. 12

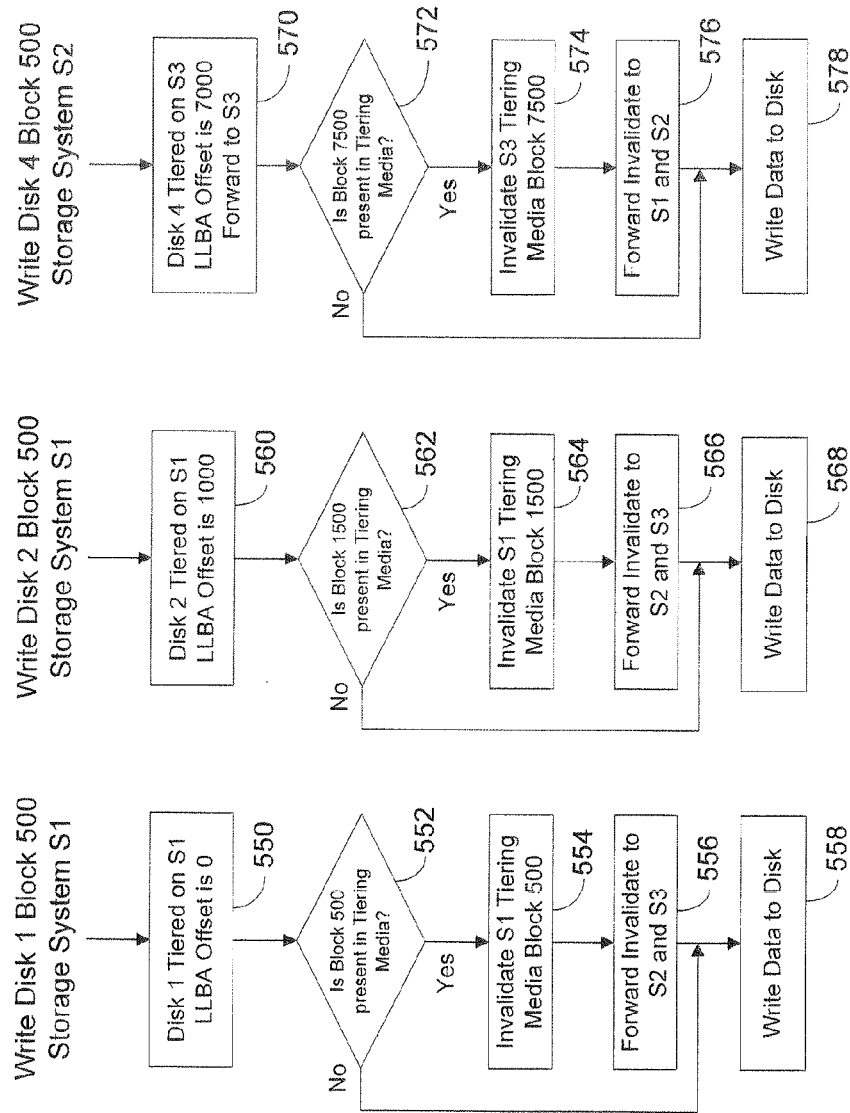

CLUSTER CONTROL PROTOCOL

This application claims priory to provisional patent application Ser. No. 61/115,426 filed Nov. 17, 2008 and is herein incorporated by reference in its entirety.

BACKGROUND

Fibre Channel (FC) provides practical and expandable means of transferring data between workstations, mainframes, supercomputers, desktop computers, and storage devices at fast data rates. Fibre Channel is especially suited for connecting computer servers to shared storage devices and for interconnecting storage controllers and drives.

Multiple proxy devices may be connected by a FC network between multiple different computers and multiple different storage devices. Depending on their function, all of the different proxy devices may need to maintain an identical state, so that consistent and correct results can be provided to each of the different computers. However, currently there is no efficient way to maintain a consistent state between the multiple different FC proxy devices.

BRIEF DESCRIPTION OF THE DRAWINGS

FIG. 12 is a Logical Block Address (LBA) mapping table.

FIGS. 16-18 are flow diagrams showing how the LBA mapping table of FIG. 12 is used for managing tiering during write operations.

DETAILED DESCRIPTION OF THE DRAWINGS

Several preferred examples of the present application will now be described with reference to the accompanying drawings. Various other examples are also possible and practical. This application may be exemplified in many different forms and should not be construed as being limited to the examples set forth herein.

Figure 1:
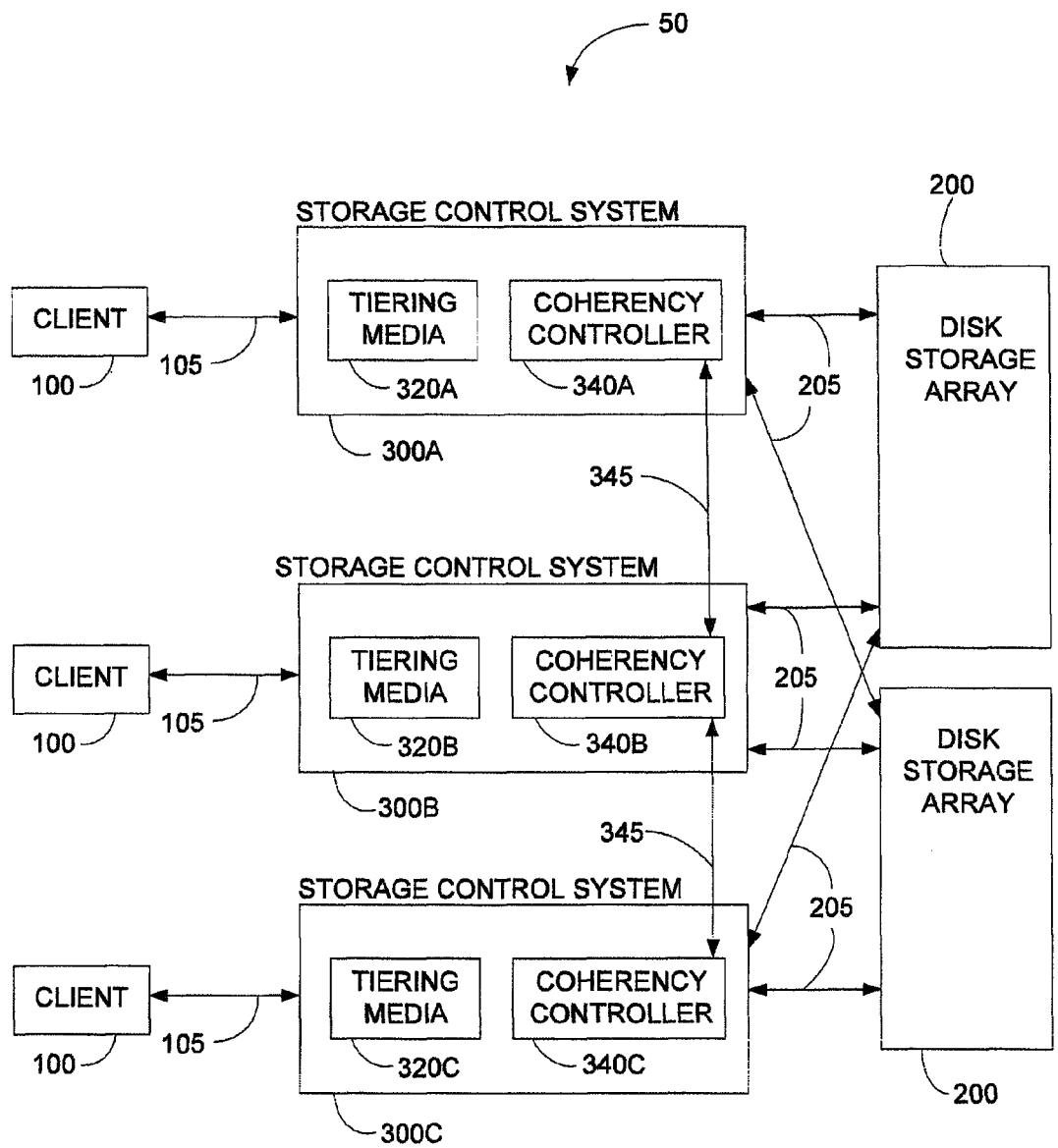
FIG. 1 shows a storage cluster architecture.

FIG. 1 shows a cluster of storage control systems 300 that are connected between clients 100 and storage disk arrays 200. The clients 100 may be servers, personal computers, terminals, portable digital devices, routers, switches, or any other wired or wireless computing device that needs to access data on disk storage array 200.

In one embodiment, the storage control systems 300 and the disk storage arrays 200 are stand-alone appliances, devices, or blades. In one embodiment, the clients 100, storage control system 300, and disk storage arrays 200 might be coupled to each other via wired or wireless connections 105 and 205 capable of transporting storage operation requests from clients 100 to disk storage arrays 200. An example of such a connection is a Fibre Channel network transporting storage operations using the Small Computer System Interface (SCSI) protocol.

In another embodiment, the clients 100 may access one or more of the disks in disk storage arrays 200 over an internal or external data bus. The disk storage arrays 200 in this embodiment could be located in personal computers or servers, or could also be a stand-alone device coupled to the computer/server 10 via a fiber channel SCSI bus, Universal Serial Bus (USB), or packet switched network connections 105 and 205.

Figure 2:
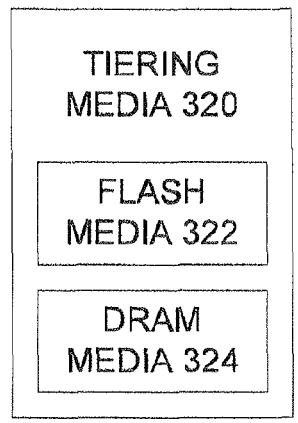
FIG. 2 shows a tiering media used in the storage cluster of FIG. 1.

The storage control systems 300 each contain one or more processors or processing elements that each operates a coherency controller 340. Tiering media 320 in each storage control system 300 is shown in more detail in FIG. 2 and contains different combinations of Flash memory 322 and Dynamic Random Access Memory (DRAM) 324 that typically provides faster access speeds than the disk storage arrays 200.

The storage control systems 300 receive read and write operations from the different clients 100 that are directed to the different disk storage arrays 200. In one embodiment, the disks contain multiple storage blocks that have associated block addresses. To improve throughput and/or to reduce latency to the data in the disk storage arrays 200, blocks of data from the disk storage arrays 200 are temporarily stored in the different tiering media 320. The storage control systems 300 then uses the data loaded in the faster tiering media 320 to service certain storage access requests from the clients 100. In one embodiment, storage control systems 300 begin storing blocks from disk storage array 200 into tiering media 320 before any storage requests by clients 100 to those specific blocks.

If a single storage control system 300 is used, all tiering data 320 can be managed with a single controller. However, if more than one storage control system 300 is used in a storage cluster 50 as shown in FIG. 1, each manages a different tiering media 320 that has to maintain coherency with all of the other tiering media. For example, storage control system 300A may receive a request from a client 100 for a block of data that is currently loaded in tiering media 320B.

In order to maintain data coherency, storage control system 300A has to be aware that the requested data block is currently located in tiering media 320B so that different versions of the same data blocks are not used in different storage control systems 300. Additionally, if storage system 300A detects a write to a block tiered within storage system 300B, it must cause storage system 300B to invalidate that tiered block. Coherency controllers 340 in the different storage control systems 300 are responsible for maintaining coherency between the different tiering media 320 in the different storage control systems 300.

A cluster interface bus 345 is coupled between each of the storage control systems 300 and is used for conducting coherency protocol operations between the different storage control systems 300 as well as transferring data to the appropriate tiering media 320. In one embodiment, this bus is a switched star configuration wherein each storage system is connected to a central switch. In another embodiment, this bus is a ring network wherein each storage system is connected to one or more neighboring systems.

In one embodiment, fiber channel connections 105 and 205 are used for connecting together the clients 100, storage controls systems 300, and disk storage arrays 200. Each client 100, storage control system 300, and disk storage array 200 operates fibre channel interface cards or Host Bus Adapters (HBA). The fibre channel HBAs allow the clients 100 and disk storage arrays 200 to communicate over the fibre channel medium 105 and 205 using the fibre channel protocol. Each physical port on each HBA in each disk storage array 200 has a unique World Wide Name (WWN) and each disk within storage array 200 has a World Wide Identifier (WWID). The WWID is similar to an Ethernet Media Access Control (MAC) address and is a unique identifier that identify a particular fibre channel, SCSI or Serial Attached SCSI (SAS) disk. As most FC networks utilize SCSI as the underlying storage protocol, any non-SCSI disk within Disk Storage Array 200 will typically be virtualized as a SCSI entity.

Figure 3:
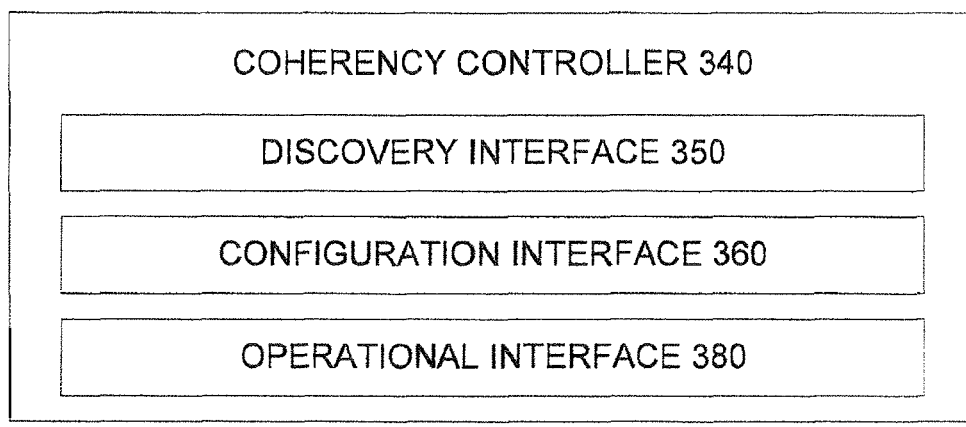
FIG. 3 shows a coherency controller used in the storage cluster of FIG. 1.

FIG. 3 shows the tiering media 320 in more detail. In one embodiment, the tiering media in each of the storage control devices 300 includes different combinations of Flash memory 322 and DRAM 324. However, any other type or combination of storage can be used in tiering media 320. For example, other types of Random Access Memory (Such as Ferroelectric RAM or Phase-change memory) or other relatively fast disk or solid state memory devices can also be used in tiering media 320.

FIG. 3 shows different operations or functional elements of the coherency controller 340. The operations may be performed by a programmable processor responsive to executed computer instructions or could be performed with logic circuitry, one or more programmable logic devices or an application specific integrated circuit (ASIC).

A discovery interface 350 in the coherence controller 340 determines which of the storage control systems 300 will operate as a master and which will operate as non-masters. The master system is then responsible for ensuring all of the non-masters have the same coherency information. The configuration interface 360 monitors configuration messages sent between the clients and disk storage arrays 200. The monitored messages are then used to automatically generate a configuration table that identifies the different connections between the clients 100 and the different disks in the disk storage arrays 200. The operational interface 380 uses the connection information obtained by the configuration interfaces 360 to handle data access requests from the clients 100 and manage the tiering media 320.

Figure 4:
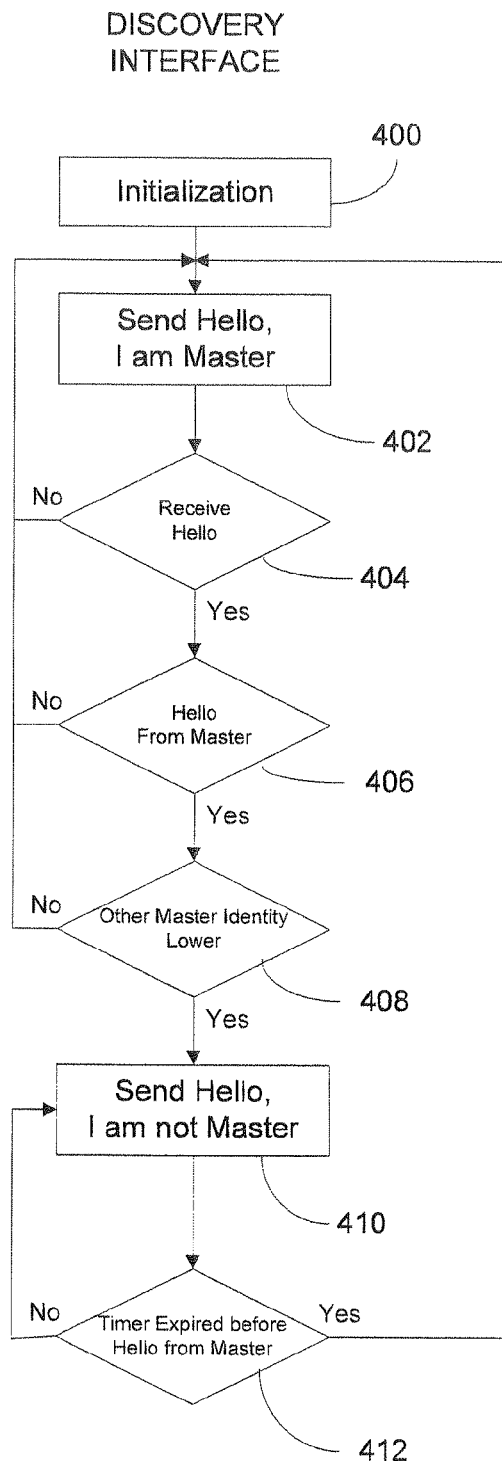
FIG. 4 is a flow diagram showing how storage control devices in the storage cluster conduct a discovery protocol.

FIG. 4 is a flow diagram that explains in more detail some of the operations performed by the discovery interface 350 of FIG. 3. In operation 400 a particular one of the storage control systems 300 powers up. Until another system 300 indicates itself as master, the coherency controller 340 will operate as a master and send out a hello message in operation 402 identifying itself as a master. If no hello messages are received back in operation 404, the coherency controller 340 will continue to operate as the master of the storage cluster 50 in FIG. 1.

If a hello message is received in operation 406, but the hello message is not from an identified master, then the controller 340 continues to operate as the master of the storage cluster 50. However, a message from another master may be received in operation 406. In this case, the coherency controller 340 with the lower unique identity number will become master in operation 408. For example, the identity number could be a MAC address, serial number, etc. The particular coherency controller 340 with the higher identity number in operation 408 will then send out a hello message in operation 410 indicating that it is no longer the master.

The coherency controller 340 is in a non-master state in operation 412 and uses a timer to monitor for periodic hello messages from the master. If a master hello message is not periodically received over some period of time, the discovery interface 350 moves back to operation 402 and starts operating as the master again. This may happen when the current master for storage cluster 50 is reconfigured, reset, or removed.

In any situation wherein master identity is changed, there exists the possibility that any shared tiering information may have to be invalidated. An example of such a situation would be the time out of a connection with an existing master. Because the current master can no longer be contacted, any tiering media state shared with that master cannot be validated and must be resolved by invalidating that tiering media. During the period of broken communications, and block of tiered media may have been invalidated within the master. The only coherent mechanism is to obtain the actual storage data from Disk Storage Array 200 rather than any tiering media.

Figures 5, 6:
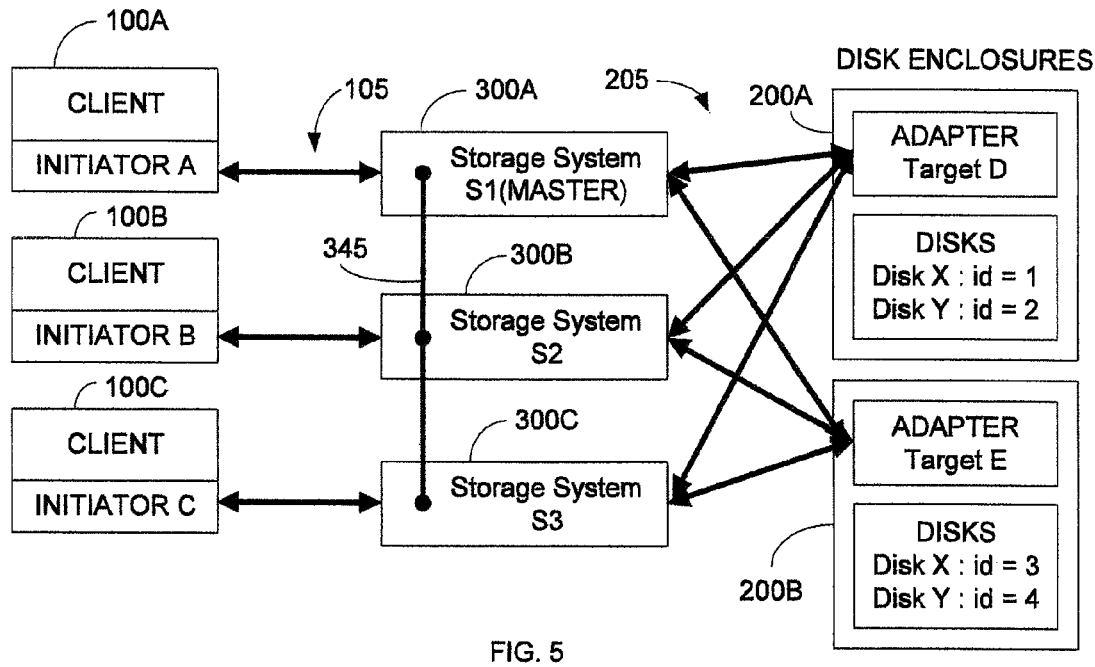
FIG. 5 shows a first storage cluster configuration.
FIG. 6 shows a configuration table generated by the storage cluster configuration shown in FIG. 5.

FIG. 5 shows one configuration where two different discs X and Y are located in a same enclosure of a first disk storage array 200A and a two other discs X and Y are located in a same enclosure of second disk array enclosure 200B. In this example, note that disk labels X and Y refer to the Logical Unit Number (LUN), an element of the SCSI protocol that is not unique and often repeated among different targets.

An important element of the subsequent discussion is the difference between this LUN and the disk id. The disk id is the previously discussed WWID that is unique to all devices. However, the FC protocol has no visibility into this id and manages only the WWN of the initiator and targets. The underlying SCSI protocol subsequently decodes the LUN for the specific initiator-target path (IT path) when routing storage commands A critical design requirement of a coherent group of fibre channel storage systems is the ability to distinguish unique disks.

In the fiber channel example, the clients 100 and disk storage arrays 200 operate fibre channel interface cards or Host Bus Adapters (HBA). The HBAs in clients 100A, 100B, and 100C are represented in FIG. 5 as initiators A, B, and C, respectively. The HBAs in disk storage arrays 200A and 200B are referred to as targets D and E, respectively. There are also HBAs in the storage control systems 300 that connect to the initiators and the targets. However, these interfaces are not shown in FIG. 5.

Further explanation of how the storage control systems 300 connect between the clients 100 and disk storage arrays 200 via fiber channel is described in co-pending patent application, Ser. No. 12/568,612, filed Sep. 28, 2009, entitled: FIBRE CHANNEL PROXY which is herein incorporated by reference in its entirety.

The fibre channel HBAs allow the clients 100 and disk arrays 200 to communicate over the fibre channel medium 105, 205 using the fibre channel protocol. Each physical port on each HBA in target D and target E has a unique World Wide Name (WWN). Target D provides access to LUNs X and Y and Target E provides access to LUNs X and Y (different physical disks within different enclosures) along their respective IT paths.

Figures 7, 8:
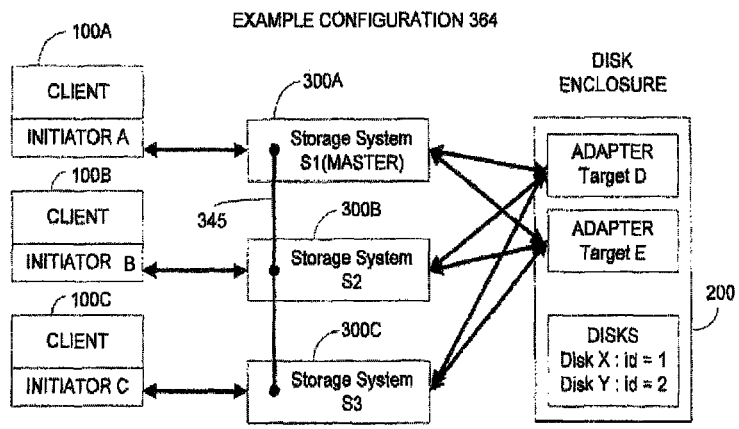
FIG. 7 shows a second storage cluster configuration.
FIG. 8 shows a configuration table generated by the storage cluster configuration shown in FIG. 7.

The problem with using these fiber channel identifiers to access targets D and E is that there is no unique indicator of which physical disk is being accessed. A comparison between the topologies of FIG. 5 and FIG. 7 illustrate this problem. In both cases, the IT paths AD and AE exist between initiator and targets. In both cases, these paths lead to LUNs X and Y. However, in the FIG. 5 case, these are different disks. In the FIG. 7 case, these are the same disks (ids are identical). Because Storage System 300 cannot differentiate based on normal SCSI storage operations (these only contain LUN, not ID), a fundamental and functional limitation exists. To overcome this limitation, SCSI WWID identifiers (ids) are mapped with fiber channel initiator, target and LUN to uniquely map all paths to different physical disks (or unique virtual disks) in the disk storage array 200.

The discovery interfaces 340 in the different storage control systems 300 monitor the SCSI messages sent back, and forth between the initiators and targets. These monitored messages are then used to create configuration table 365 in FIG. 6. The configuration table 365 provides the unique connection mappings described above that allow the coherency controllers 340 to correctly manage tiering data 320 associated with different physical disks in the disk storage arrays 200.

For example, one of the clients/initiators 100, such as initiator A in FIG. 5 powers up and sends fiber channel registration requests through the storage control system 300A to the targets D and E. The registration requests contain the WWN of the initiator A which in this example is WWN=A. Initiator A receives responses back through the storage control system 300A from the targets D and E indicating WWN=D and WWN=E, respectively. Initiator A sends a fibre channel confirmation message back to targets D and E through storage control system 300A confirming initiator WWN=A is now connected to targets WWN=D and WWN=E.

The initiator A then sends SCSI messages to the targets D and E querying what disks/LUNs are available. The storage control system 300A forwards the SCSI messages to the targets D and E that respond back with SCSI messages each identifying disks/LUNs X and Y. Again note that in this example, the LUN for disk X on target D may be the same as the LUN for disk X on target E. Similarly, the LUN for disk Y on target D may be the same value as the LUN for disk Y on target E.

The client 100A sends SCSI inquiries to the disks/LUNs X and Y on target D and target E. In this example, disk/LUN X on target D responds back indicating it is a mass storage device having a size of 1000 blocks and a SCSI Id=1. Disk/LUN Y on target D responds back indicating it is a mass storage device having a size of 2000 blocks and a unique SCSI Id=2. Disk/LUN X on target E separately responds back to client 100A indicating it is a mass storage device having a size of 4000 blocks and a unique SCSI Id=3 and disk/LUN Y on target E responds back indicating it is a mass storage device having a size of 8000 blocks and a unique SCSI Id=4. Of course, the values described above are just examples used for illustrative purposes.

These SCSI reply messages are forwarded back through the storage control system 300A to client 100A. Client 100A then chooses to mount and configure the particular disks/LUNs from targets D and E. These fiber channel and SCSI messages are monitored by the configuration interface 360 in storage control system 300A and then used for generating portions of configuration table 365 in FIG. 6.

Through the exchange of connection messages between initiator A and targets D and E, the configuration interface 360 determines that initiator A is connected to both target D and target E. Accordingly, the configuration interface 360 in storage control system 300A generates a first entry in configuration table 365 of FIG. 6 that identifies a first Path Id=1 in column 365A, initiator A in column 365B, and target D in column 365C. The configuration interface 360 also identifies the particular LUN=X in column 365D and SCSI Id=1 in column 365E in table 365 associated with disk X in target D. Mapping the unique SCSI Id=1 and disk X with a particular initiator/target connection allows the storage cluster 50 to then accurately keep track which tiering media 320 is being used by the different disks The configuration interface 360 generates a different entry in table 365 for each different initiator, target, LUN and SCSI Id combination. For example, the configuration interface 360 in storage control system 300A generates a second entry for table 365 that identifies a second path id=2 for the connection between initiator A and target D where LUN=Y and SCSI Id=2. The configuration interface 360 also generates an entry in table 365 with Path Id=3 for the connection between initiator A and target E where LUN=X and SCSI Id=3, and generates a separate entry with Path Id=4 for the connection between initiator A and target E where LUN=Y and SCSI Id=4. As a result of this process, LUN X on IT Path AD and LUN X on IT Path AE are confirmed to be different disks. The discovered topology would be inconsistent with a configuration such as that in FIG. 7. A similar deduction is possible for the two LUN Y disks.

Initiator B may separately come on-line and communicate through storage control system 100B requesting LUNs from target D. Target D may reply with the same LUN identifiers X and Y and SCSI identifiers 1 and 2. The configuration interface 360 in storage control system 100B determines that the LUNs and SCSI Ids are the same as those used in the first and second entries in table 365 for Path Id=1 and Path Id=2, respectively. Accordingly, the configuration interface 360 in storage control system 100B adds two new entries Path Id=5 and Path Id=6 to configuration table 365 that associate the connection between initiator=B and target=D with LUN=X and SCSI Id=1, and LUN=Y, SCSI Id=2, respectively. Entries are added to configuration table 365 for each different combination of initiator, target, LUN, and SCSI Id.

The configuration table 365 is then used by the coherency controllers 340 in the different storage control systems 300 to maintain coherency between the different tiering media 320 in FIG. 1. For example, client C may write data to a particular block address. The configuration table 365 is used by coherency controller 340 to identify any tiering media 320 in any of the storage control systems 300 that may contain a previous version of the write data that may need to be invalidated.

FIG. 7 shows a second different cluster configuration 364 between the initiators and the disk storage array 200. In this configuration, a disk storage array 200 exists in a single enclosure that includes two different fiber channel interfaces identified as targets D and E. There are two disks X and Y in disk storage array 200 that each have a different SCSI identifiers SCSI Id=1 and SCSI Id=2, respectively.

FIG. 8 shows another configuration table 370 that includes entries corresponding with the storage cluster configuration shown in FIG. 7. The initiator disk mappings in table 370 are automatically generated by the different configuration interfaces 360 in the different storage controls systems 300A, 300B, and 300C in the same manner described above in FIGS. 5 and 6.

As can be seen, the SCSI Id=1 and SCSI Id=2 identified for the disks X and Y. respectively, are mapped to each different initiator/target connection in FIG. 7. It should be noted that without including the SCSI identifiers in column 370E, the configuration table 365 in FIG. 6 and the configuration table 370 in FIG. 8 would be the same. Thus, it can be seen that associating SCSI identifiers with the different fiber channel paths allow the clients 100 to be uniquely mapped with different disks in different disk storage array targets for different storage cluster configurations.

Figure 9:
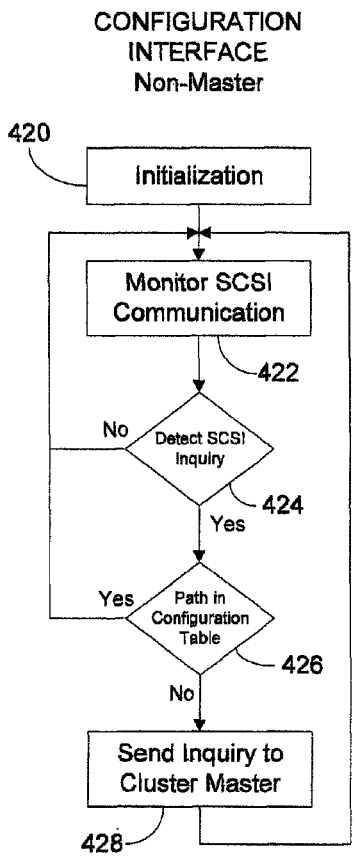
FIGS. 9-11 are flow diagrams showing how the storage control devices in FIGS. 5 and 7 generate the configuration tables in FIGS. 5 and 7.
Figure 10:
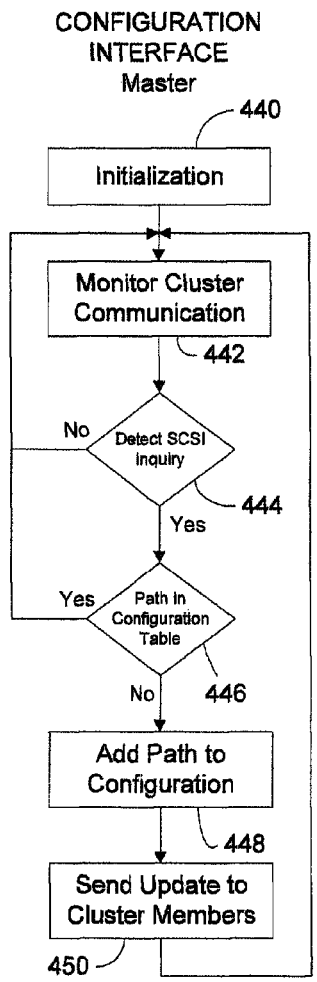
Figure 11:
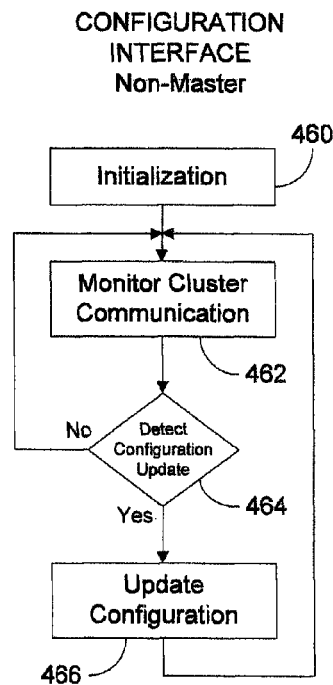

FIGS. 9 and 11 show in more detail how the non-master configuration interfaces 360 update information in the configuration table 365 or 370 and FIG. 10 shows how the master configuration interface 360 updates the configuration tables 365 or 370. For explanation purposes, the description below will only refer to the cluster configuration in FIG. 5 and the corresponding configuration table 365 in FIG. 6.

In this example, the master discovery process previously described in FIG. 4 determined that the storage control system 300A is the master and the storage control systems 300B and 300C are non-masters. Accordingly, the configuration interface 360 operating in storage control system 300A operates as the master and the configuration interfaces 360 operating in storage control systems 300B and 300C operate as non-masters.

Referring to FIG. 9 the non-master configuration interfaces 360 in storage control systems 300B and 300C initialize in operation 420 and start monitoring the SCSI communication messages between the initiators and targets in operation 422 as described above. For example, the non-master configuration interfaces monitor for SCSI inquires from initiators asking targets for LUNs. If no SCSI inquires are detected in operation 424, the non-masters continue monitoring in operation 422. If a new SCSI connection is detected, the fibre channel path including the LUN and SCSI Id are identified in operation 426.

If the identified connection path already exists in configuration table 365, the non-master goes back to operation 422 and continues to monitor for SCSI messages. If a new connection path is identified that does not currently reside in the configuration table 365, the non-master in operation 428 sends an inquiry to the master coherence controller 340A in FIG. 5 that includes the path information for the new connection.

FIG. 10 explains the operations performed by the master configuration interface 360 in storage control system 300A. The configure interface 360 initializes in operation 440 and in operation 442 monitors for communications from other non-master configuration interfaces reporting a SCSI inquiry. The master also monitors for SCSI inquires from any directedly connected initiators. For example, master 300A monitors the SCSI inquires of initiator A in FIG. 5 to the different targets D and E.

When a SCSI inquiry is received in operation 444 either from another non-master configuration interface, or from monitoring SCSI communications to and from initiator A, the master configuration interface 360 in operation 446 determines if the connection path is already contained in the configuration table 365. For example, the master will check and see if the combination of initiator, target, LUN and SCSI Id currently exist in configuration table 365. If not, then a new path id entry is added to the configuration table 365 in operation 448 and the updated configuration table is sent out to the other non-master configuration interfaces in operation 450.

In FIG. 11, the non-master configuration interface initializes in operation 460 and also starts monitoring for communications from other configuration interfaces 360 in operation 462. If a configuration update is received from the master configuration interface 360 in operation 464, the non-master updates or replaces a local non-master configuration table with the new configuration updates received from the master. For example, a new Path Id entry may be identified in the configuration updates from the master that is then added to the local configuration table 365 by the non-master.

There are situations where configuration table updates from a master are rejected by a non-master. For example, a current master may reboot and as a result send out outdated configuration tables. In this situation, one of the non-master configuration interfaces 360 may determine the current master no longer possesses the latest cluster configuration information. The non-master may then take over as master until the previous master re-syncs to the most current configuration table for the storage cluster.

FIG. 12 shows a Logical Block Address (LBA) mapping table 385 that is used in conjunction with the configuration table 365 previously shown in FIG. 6. The LBA mapping table 385 is either generated manually by a system administrator, or can be automatically generated by the master configuration interface 360 based on the data obtained from configuration table 365.

Column 385A of mapping table 385 contains the same path Ids used in configuration table 365 to identify the different SCSI connections established between the initiators and different disks. Column 385B contains the same SCSI Ids for the associated disks that were identified in column 365E of configuration table 365 in FIG. 6. For example, the disk X associated with path Id=1 has a SCSI Id=1.

Column 385C identifies the storage size for the disks associated with the SCSI Ids identified in column 385B. For example, disk X associated with target D in FIG. 5 has a disk size of 1000 blocks identified in column 385C of table 385 and disk Y of target D has a size of 2000 blocks. Disk X associated with target E in FIG. 5 has a block size of 4000 blocks and disk Y of target E has a block size of 8000 blocks. The block size refers to the number of storage blocks that exist in the associated disk. Each individual block can be any size, but in one example comprises 64 Kbytes of storage.

Column 385D identifies different virtual block address ranges (VBA) for each of the different physical disks identified in mapping table 385. For example, there are four different disks identified in mapping table 385 that together include 15000 blocks. The 15000 blocks are combined into a same virtual address range in column 385D where disk X, SCSI Id=1 is assigned virtual address range 0-999; disk Y, SCSI Id=2 virtual address range 1000-2999; disk X, SCSI Id=3 virtual address range 3000-6999; and disk Y, SCSI Id=4 virtual address range 7000-14999.

Column 385E simply identifies the virtual address offsets associated with the virtual address ranges identified in column 385D. For example, disk X, SCSI Id=1 starts at virtual address 0; disk Y, SCSI Id=2 virtual address 1000; disk X, SCSI Id=3 virtual address 3000; and disk Y, SCSI Id=4 virtual address 7000.

Column 385F identifies which tiering media 320 in which of storage control systems 300A (S1), 300B (S2), or 300C (S3) is used for tiering the data associated with the virtual addresses identified in column 385D. For example, the tiering media 320A in storage control system 300A (S1) of FIG. 5 tiers the data blocks for disk X, SCSI Id=1 and disk Y, SCSI Id=2. Tiering media 320B in S2 of FIG. 5 tiers the data blocks for disk X, SCSI Id=3 and tiering media 320C in S3 tiers the data blocks for disk Y, SCSI Id=4.

Figures 13, 14, 15:
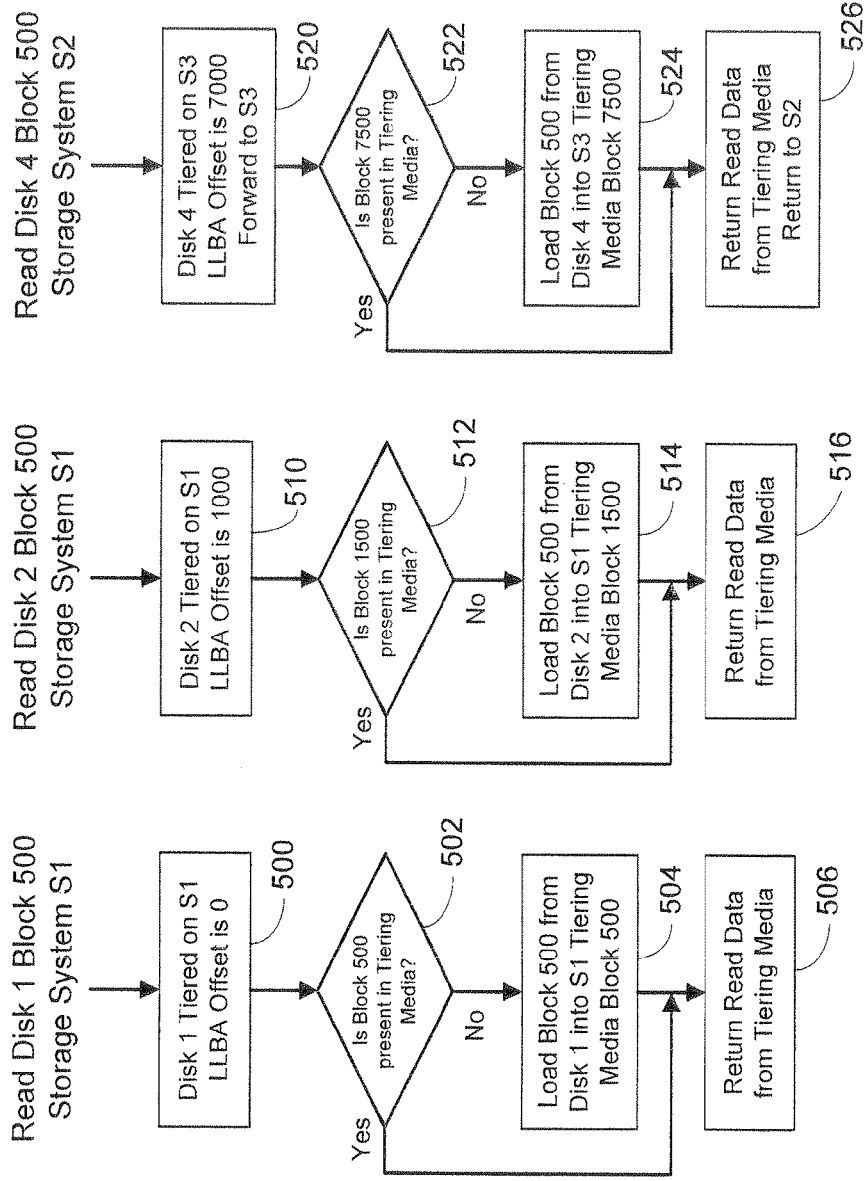
FIGS. 13-15 are flow diagrams showing how the LBA mapping table of FIG. 12 is used for managing tiering during read operations.

FIGS. 13-15 explain how the LBA mapping table 385 is used by the operational interfaces 380 in the different coherency controllers 340 previously shown in FIG. 3. Referring to FIGS. 5 and 13, storage control system S1 receives a read operation from client 100A. The operational interface 380 in S1 determines the read operation is directed to disk SCSI Id=1 and has a block address=500. The storage operation itself, as transmitted within the SCSI protocol does not contain the unique SCSI id. The FC header information contains the Initiator and Target information while the SCSI command contains the LUN. This triplet can then be used to identify the path and unique disk id. More specifically, at the time the storage operation is issued, it would be impossible to know the unique disk id without the information from the local configuration table 365. The operational interface 380 in operation 500 refers to LBA table 385 and determines that the tiering media 320 assigned to SCSI Id=1 and address 500 is S1. Operation 500 also identifies from LBA table 385 that the virtual address offset is 0 for physical block address 500 in disk 1.

In operation 502 the operational interface 380 in S1 checks to see if block address 500 is currently present in the tiering media 320A. Since there is no virtual address offset, the same physical block address 500 from the read operation is used in operation 502. If block address 500 is not currently located in tiering media 320A, operation 504 loads data at block address 500 in disk 1 (storage array 200A, disk X, SCSI Id=1) into address location 500 of tiering media 320A in S1. If block address 500 is currently located in tiering media 320A, operation 506 returns the data contained in address location 500 of tiering media 320A to the client 100A.

Referring to FIGS. 5 and 14, storage system S1 receives another read operation from client 100A for block address 500 but for disk 2 (SCSI Id=2). The operational interface 380 in operation 510 refers to LBA table 385 and determines that the tiering media 320 assigned to SCSI Id=2 is also in S1. The operational interface 380 in operation 512 also identifies the virtual address offset in LBA table 385 for physical block address 500 of disk 2 is 1000.

Since there is an address offset of 1000, the virtual block address 500÷1000=1500 is used in operation 512. In operation 512, the interface 380 of S1 checks to see if virtual block address 1500 is present in tiering media 320A. If virtual block address 1500 is not currently located in tiering media 320A, operation 514 loads physical block address 500 from disk 2 (storage array 200A, disk Y, SCSI Id=2) into virtual address location 1500 of tiering media 320A. If virtual block address 1500 is currently located in tiering media 320A, operation 516 returns the data block from virtual address location 1500 of tiering media 320A to the client 100A.

Referring to FIGS. 5 and 15, storage system S2 receives a read operation from client 100B with a physical block address 500 directed to disk 4 (SCSI Id=4). The operational interface 380 for storage control system S2 in operation 520 refers to a local LBA table 385 and determines that the tiering media 320 assigned to SCSI Id=4 is located on storage control system S3. The read operation is accordingly forwarded by S2 to S3 in operation 520. Operation 520 also identifies the virtual address offset in LBA table 385 for block 500 of disk 4 as 7000.

In operation 522 the interface 380 in S3 checks to see if virtual block address 7500 is present in tiering media 320C of S3. Since there is an address offset of 7000, the virtual block address 7500 is used in operation 522. If virtual block address 7500 is not currently located in tiering media 320C, operation 524 loads data from physical block address 500 of disk 4 (storage array 200B, disk Y, SCSI Id=4) into virtual address location 7500 of tiering media 320C. If virtual block address 7500 is currently located in tiering media 320C, operation 526 sends the data block from virtual address location 7500 of tiering media 320C to S2 over bus 345. Storage control system S2 then forwards the data block to client 100B.

FIGS. 16-18 describe examples of what the operational interfaces 380 do during write operations. Referring to FIGS. 5 and 16, storage system S1 receives a write operation from client 100A. The operational interface 380 in S1 determines identifies a write operation directed to the disk with SCSI Id=1 and having a physical block address=500. The interface 380 in operation 550 refers to LBA table 385 and determines that the tiering media 320A on S1 is assigned to SCSI Id=1.

The operational interface 380 in operation 550 also identifies from LBA table 385 that the virtual address offset for block 500 in disk 1 is 0.

In operation 552 the operational interface 380 in S1 checks to see if virtual block address 500 is present in the tiering media 320A. Since there is no virtual address offset, the physical block address 500 from the write operation is used in operation 552. If virtual block address 500 is not currently located in tiering media 320A, no tiering invalidation operations need to be performed. Operation 558 then writes the data block into physical block address 500 of disk X, SCSI Id=1, storage array 200A. A separate decision to load the write data into one of the tiering media 320 can be made after a write acknowledgment is received back from the disk storage array 200A.

If block 500 is currently located in tiering media 320A, operation 554 invalidates the virtual block address 500 in tiering media 320A. The invalidation message may then be sent in operation 556 to the other storage control systems S2 and S3. Since the other storage control systems S2 and S3 do not tier virtual block data address 500, they each may choose to ignore the invalidation message. However, in certain configurations, storage controls systems S2 and S3 may use the invalidation to update any address maps that could be linked to the invalidated virtual address space.

Referring to FIGS. 5 and 17, storage control system S1 receives another write operation from client 100A. The operational interface 380 in S1 determines the write operation is directed to a physical block address=500 for a disk with SCSI Id=2. The operational interface 380 in operation 560 refers to LBA table 385 and determines that the tiering media 320A on S1 is assigned to SCSI Id=2. Operation 560 also identifies the virtual address offset in LBA table 385 for block 500 of disk 2 as 1000.

In operation 562 the operational interface 380 in S1 checks to see if virtual block address 1500 is present in the tiering media 320A. Since there is a virtual address offset of 1000, a virtual block address of 1500 is used in operation 562. If virtual block address 1500 is not currently located in tiering media 320A, no tiering invalidation operations need to be performed and the data block is written into physical block address 500 of disk Y, SCSI Id=2, storage array 200A in operation 568.

If virtual block address 1500 is currently located in tiering media 320A, operation 564 invalidates virtual block address 1500 in tiering media 320A of S1. The invalidation message may then be sent in operation 566 to the other storage control systems S2 and S3.

Referring to FIGS. 5 and 18, storage control system S2 receives a write operation from client 100B. The operational interface 380 in S2 determines the write operation is directed to a block address=500 in disk 4 with SCSI Id=4. The operational interface 380 in operation 570 refers to LBA mapping table 385 and determines that the tiering media 320C on S3 is assigned to SCSI Id=4. The write operation is accordingly forwarded by S2 to S3. The operational interface 380 in operation 570 also identifies from LBA table 385 that the virtual address offset for block 500 of disk 4 is 7000.

In operation 572 the operation interface 380 in S3 checks to see if virtual block address 7500 is present in the tiering media 320C. Since there is a virtual address offset of 7000, a virtual block address of 7500 is used in operation 572. If virtual block address 7500 is not currently located in tiering media 320C, no tiering invalidation operations need to be performed and the data block is written into physical block address 500 of disk Y, SCSI Id-4, storage array 200B in operation 578.

If virtual block address 7500 is currently located in tiering media 320C, operation 574 invalidates virtual block address 7500 in tiering media 320C in S3. The invalidation message may then be sent in operation 576 to the other storage control systems S1 and S2. Storage control system S2 then writes the data block into physical block address 500 of disk Y, SCSI Id=4, storage array 200B in operation 578.

At this point, the storage control system S2 may receive a notification back from disk 4 indicating the data has been successfully stored. Any variety of operations then may be performed by the storage control systems 300. For example, S2 may send a notification to S3 that the write is complete. The storage control system S3 may then make a decision whether to tier the write data in tiering media 320C.

The master in the storage cluster 50 creates the mapping table 385 and pushes updates to the slave storage control systems. This allows the storage cluster 50 to operate as an aggregated tiering media storage pool. The aggregated tiering media is larger than the memory of each individual storage control system 300. It should be apparent that this aggregation can provide more extensive tiering than a single storage device, or extends tiering to many more storage devices in an efficient manner.

The cluster control protocol described above can include any combination of software and/or hardware within the storage cluster 50. For example, the cluster operations described herein could be controlled by a processor executing software instructions.

Several preferred examples have been described above with reference to the accompanying drawings. Various other examples of the application are also possible and practical. The system may be exemplified in many different forms and should not be construed as being limited to the examples set forth above.

The figures listed above illustrate preferred examples of the application and the operation of such examples. In the figures, the size of the boxes is not intended to represent the size of the various physical components. Where the same element appears in multiple figures, the same reference numeral is used to denote the element in all of the figures where it appears.

Only those parts of the various units are shown and described which are necessary to convey an understanding of the examples to those skilled in the art. Those parts and elements not shown may be conventional and known in the art.

The system described above can use dedicated processor systems, micro controllers, programmable logic devices, or microprocessors that perform some or all of the operations. Some of the operations described above may be implemented in software and other operations may be implemented in hardware.

For the sake of convenience, the operations are described as various interconnected functional blocks or distinct software modules. This is not necessary, however, and there may be cases where these functional blocks or modules are equivalently aggregated into a single logic device, program or operation with unclear boundaries. In any event, the functional blocks and software modules or features of the flexible interface can be implemented by themselves, or in combination with other operations in either hardware or software.

The invention claimed is:

1. A method for managing a group of storage control systems in communication with clients and storage arrays, each storage control system having tiering media and a coherence controller, comprising: discovering a master storage control system of the group of storage control systems;

discovering connection information between clients and disks of the storage arrays established through the storage control systems;

sending the connection information to the master storage control system;

updating a connection table in the master storage control system that identifies the connection information discovered by each of the group of storage control systems;

sending the connection information of the connection table to the group of storage control systems;

using the connection information to maintain coherency between tiering media contained in the group of storage control systems; and generating a mapping table that maps different portions of a same virtual address range with tiering media located in different storage control systems of the group of storage control systems, wherein the mapping table maps different portions of a same logical address range with different tiering media operated by the different storage control systems; the mapping table includes address offsets for the different portions of the logical address range; and, the logic circuitry is configured to generate virtual addresses by adding the address offsets to physical addresses contained in the storage operations.

2. The method according to claim 1 further comprising discovering the connection information by monitoring Small Computer System Interface (SCSI) communications between the clients and the disks with the members of the storage cluster.

3. The method according to claim 2 wherein the connection information includes:
 a SCSI initiator identifier identifying a particular one of the clients;
 a SCSI target identifier identifying a target connecting to the particular one of the clients;
 a Logical Unit Number (LUN) associated with a particular disk on the target; and
 a SCSI identifier uniquely identifying the particular disk on the target.

4. The method according to claim 3 wherein the SCSI identifier is a world-wide ID number that uniquely defines the particular disk.

5. The method according to claim 1 further comprising mapping the different portions of the virtual address range in the mapping table to Small Computer System Interface (SCSI) identifiers associated with the disks.

6. The method according to claim 5 further comprising:
 receiving storage access requests from the clients associated with particular disks, wherein the storage access requests include associated physical addresses;
 identifying SCSI identifiers in the mapping table corresponding with the particular disks associated with the storage access request;
 locating particular storage control systems of the group of storage control systems in the mapping table corresponding with the SCSI identifiers identified in the mapping table; and
 sending the storage access requests to the storage control systems located in the mapping table.

7. The method according to claim 6 further comprising:
 identifying address offsets in the mapping table associated with the SCSI identifiers identified in the mapping table;
 generating virtual addresses by adding the address offsets to the physical addresses in the storage access requests; and using the virtual addresses to locate data in the tiering media in the particular storage control systems of the group of storage control systems.

8. An apparatus, comprising:

a plurality of storage control systems;

tiering media located in the storage control systems;

a master storage control system of the plurality of storage control systems configured to maintain and send a mapping table of storage paths of the plurality of storage control systems to the plurality of storage control systems; and logic circuitry configured to receive storage operations and forward the storage operations to the storage control systems having storage paths in the mapping table corresponding with connection information for the storage operations, wherein the mapping table maps different portions of a same logical address range with different tiering media operated by the different storage control systems; the mapping table includes address offsets for the different portions of the logical address range; and, the logic circuitry is configured to generate virtual addresses by adding the address offsets to physical addresses contained in the storage operations.

9. The apparatus according to claim 8 wherein the storage paths in the mapping table include an initiator identifier, a target identifier, and a Logical Unit Number.

10. The apparatus according to claim 9 wherein the logic circuitry is configured to map the different storage paths in the mapping table with Small Computer System Interface (SCSI) identifiers.

11. The apparatus according to claim 8 wherein the logic circuitry is configured to automatically generate updates to the mapping table for new storage paths established between the clients and the disks and then automatically forward the updates to the storage control systems of the plurality of storage control systems.

12. A storage control system, comprising:

a plurality of storage controllers in communication with clients; and storage disks, comprising:

tiering media; and a coherency controller, further comprising:

a configuration interface configured to monitor communications between the clients and the storage disks and generate a configuration table identifying connection paths between the clients and the storage disks; and an operational interface configured to use the tiering media to store data associated with the storage operations according to the connection paths identified in the configuration table wherein a storage controller of the plurality of storage controllers is a master storage controller and the configuration table is in the master storage controller; the coherency controller further comprises a discovery interface configured to identify different members of a same group of storage control systems that each contain associated tiering media; the configuration interface is configured to derive a mapping table that maps the connection paths with the tiering media in the group of storage control systems; the mapping table maps different portions of a same logical address range with different tiering media operated by the different storage control systems with address offsets for the different portions of the logical address range; and, the logic circuitry is configured to generate virtual addresses by adding the address offsets to physical addresses contained in the storage operations.

13. The storage control system according to claim 12 wherein the configuration interface is further configured to:

identify new connection paths between the clients and the disks;

generate an updated configuration table in the master storage controller that includes the new connection paths; and send the updated configuration table to the group of storage control systems.

14. The storage control system according to claim 12 wherein the operational interface is configured to forward the storage operations to the members of the group of storage control systems having connection paths in the mapping table associated with the storage operations.

15. The storage control system according to claim 12 wherein the configuration interface is further configured to:

identify a single logic address range in the mapping table that includes the tiering media in each of the group of storage control systems;

detect a new storage control system of the group of storage control systems having tiering media;

generate an updated mapping table with a new logical address range that includes the tiering media of the new storage control system; and send the updated mapping table to the different members of the group of storage control systems.

* * * * *